(12) United States Patent
Huang et al.

(10) Patent No.: US 9,145,954 B2
(45) Date of Patent: Sep. 29, 2015

(54) BELT ADJUSTING DEVICE OF PRINTER

(71) Applicant: ShenZhen Goldsun Network Intelligence Technology Co., Ltd., ShenZhen (CN)

(72) Inventors: Szu-Hai Huang, New Taipei (TW); Ching-Ju Kuo, New Taipei (TW)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 352 days.

(21) Appl. No.: 13/848,060

(22) Filed: Mar. 21, 2013

(65) Prior Publication Data

US 2013/0324338 A1 Dec. 5, 2013

(30) Foreign Application Priority Data

Jun. 4, 2012 (TW) .............................. 101119906 A

(51) Int. Cl.
*F16H 7/10* (2006.01)
*F16H 7/14* (2006.01)
*B41J 19/00* (2006.01)

(52) U.S. Cl.
CPC *F16H 7/14* (2013.01); *B41J 19/005* (2013.01)

(58) Field of Classification Search
CPC .......... F16H 2007/0808; F16H 7/1263; F16H 2007/0806; F16H 7/14; B41J 19/005
USPC .......................................... 474/112, 113, 114
See application file for complete search history.

(56) References Cited

U.S. PATENT DOCUMENTS

| | | | | | |
|---|---|---|---|---|---|
| 1,575,307 | A | * | 3/1926 | Bachmann | 451/340 |
| 2,057,650 | A | * | 10/1936 | Lindgren | 172/301 |
| 2,300,522 | A | * | 11/1942 | Redshaw | 65/194 |
| 2,366,527 | A | * | 1/1945 | Heath | 474/72 |
| 3,111,230 | A | * | 11/1963 | Pesenti | 414/7 |
| 3,670,861 | A | * | 6/1972 | Zenner et al. | 400/338.2 |
| 4,237,744 | A | * | 12/1980 | Jolly | 474/116 |
| 4,500,002 | A | * | 2/1985 | Koshio et al. | 209/534 |
| 4,779,479 | A | * | 10/1988 | Abrams et al. | 74/501.6 |
| 5,271,742 | A | * | 12/1993 | Mitcham | 474/112 |
| 6,004,236 | A | * | 12/1999 | Suzuki | 474/115 |
| 6,485,383 | B1 | * | 11/2002 | Hendricks et al. | 474/101 |
| 6,567,633 | B2 | * | 5/2003 | Burdick et al. | 399/165 |
| 7,077,773 | B2 | * | 7/2006 | Chapman et al. | 474/112 |
| 7,115,056 | B2 | * | 10/2006 | Rapkin et al. | 474/133 |
| 7,367,169 | B2 | * | 5/2008 | Katsumata | 53/64 |
| 7,758,460 | B2 | * | 7/2010 | Osakabe et al. | 474/117 |
| 2001/0024986 | A1 | * | 9/2001 | Sato et al. | 474/148 |
| 2004/0209720 | A1 | * | 10/2004 | Chapman et al. | 474/113 |
| 2005/0096165 | A1 | * | 5/2005 | Lin | 474/101 |
| 2006/0100046 | A1 | * | 5/2006 | Fuse | 474/101 |
| 2006/0240924 | A1 | * | 10/2006 | Osakabe et al. | 474/117 |
| 2007/0225095 | A1 | * | 9/2007 | Ito | 474/101 |
| 2009/0062048 | A1 | * | 3/2009 | Nakura | 474/135 |
| 2009/0270210 | A1 | * | 10/2009 | Firdaus et al. | 474/112 |

(Continued)

*Primary Examiner* — Henry Liu
(74) *Attorney, Agent, or Firm* — Novak Druce Connolly Bove + Quigg LLP

(57) ABSTRACT

A belt adjusting device of a printer includes a bracket, a base, a driving device, and a resisting member. The bracket includes a bottom wall and a belt placed on the bottom wall. The belt is loop-shaped. The base is slidably mounted to the bracket. The driving device is mounted to the base and includes an eccentric device engaging with the belt. The resisting member resists the driving device to enable the eccentric device to rotate to adjust the belt when the base slides relative to the bracket.

20 Claims, 7 Drawing Sheets

(56) References Cited

U.S. PATENT DOCUMENTS

| | | | |
|---|---|---|---|
| 2010/0247174 A1* | 9/2010 | Hori et al. | 399/303 |
| 2012/0057908 A1* | 3/2012 | Meguro | 399/313 |
| 2013/0100206 A1* | 4/2013 | Sekino | 347/37 |
| 2013/0165283 A1* | 6/2013 | Braun et al. | 474/112 |
| 2013/0251404 A1* | 9/2013 | Ishida et al. | 399/167 |

* cited by examiner

BELT ADJUSTING DEVICE OF PRINTER

BACKGROUND

1. Technical Field

The present disclosure relates to printers, more particularly to a belt adjusting device of a printer.

2. Description of Related Art

A printer includes a bracket and a base. The bracket includes a motor and a belt driving the base to move. However, the belt contact the shaft of the motor loosely due to repeated use, which affects the precision movement of the base.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
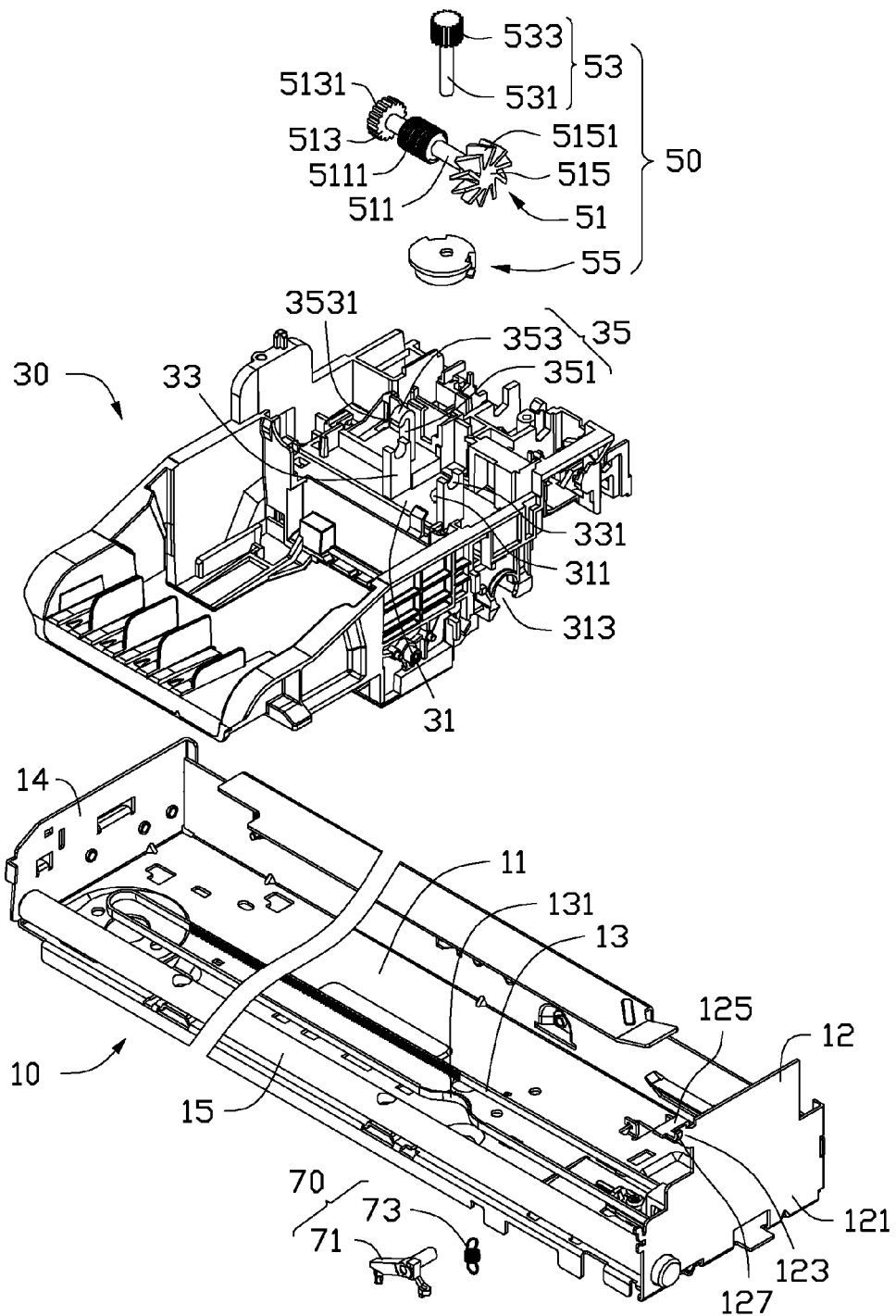
FIG. 1 is an exploded, isometric view of a belt adjusting device in accordance with one embodiment of the present disclosure.
Figure 2:
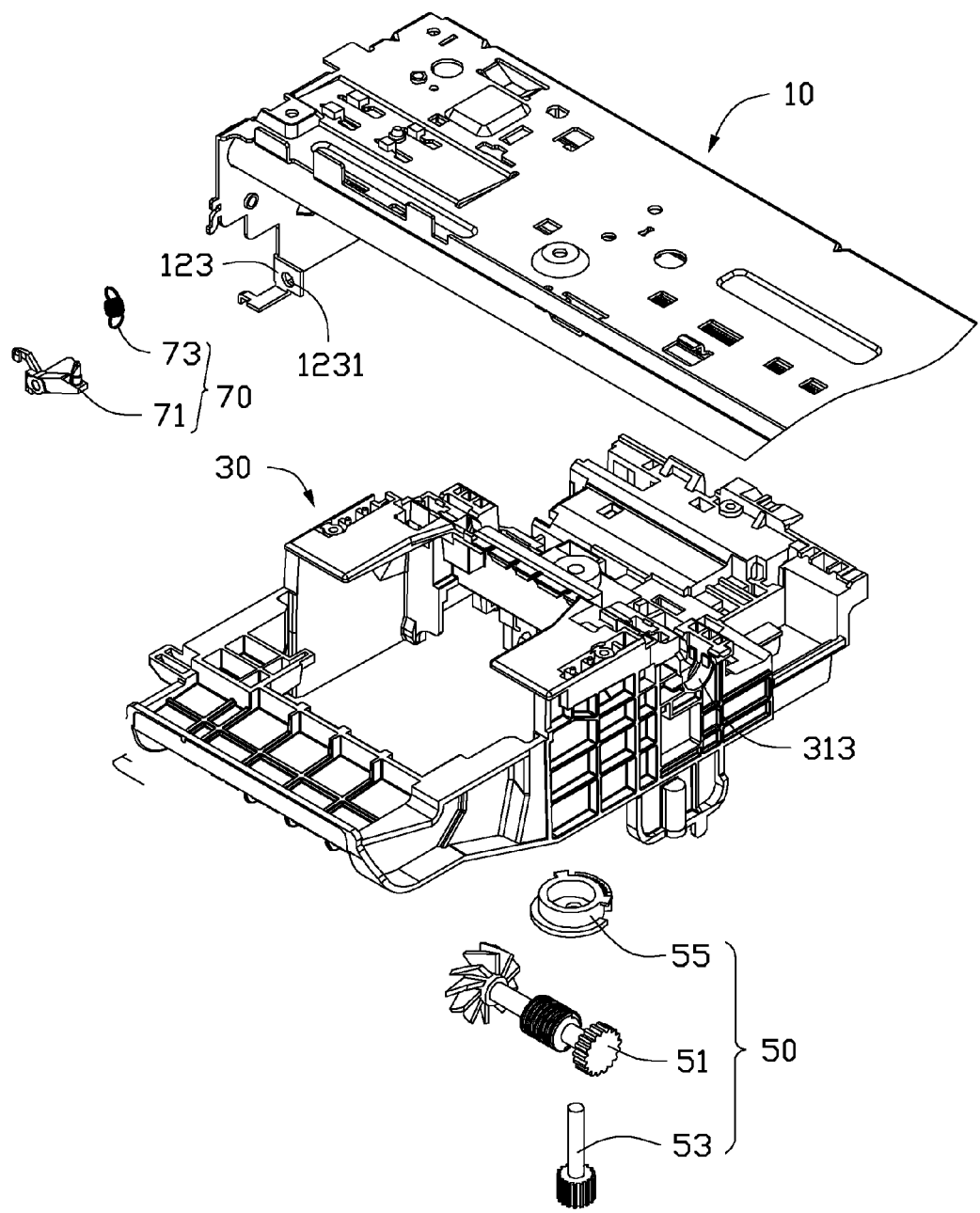
FIG. 2 is similar to FIG. 1, but viewed from another aspect.

Referring to FIGS. 1 and 2, a belt adjusting device of a printer for a computer in accordance with one embodiment includes a bracket 10, a base 30, a driving device 50 mounted to the base 30, and a resisting device 70 mounted to the bracket 10.

The bracket 10 includes a bottom wall 11, a first side wall 12, a second side wall 14 extending from the bottom wall 11, a sliding shaft 15 connected between the first side wall 12 and the second side wall 14, a belt 13 and a motor (not shown) for driving the belt 13. The belt 13 is loop-shaped. The first side wall 12 and the second side wall 14 are substantially parallel to each other. The sliding shaft 15 is substantially perpendicular to the second side wall 14 and the bottom wall 11. The belt 13 defines a plurality of teeth 131 on the inner side of the belt 13. The first side wall 12 includes a side wall body 121, a pivoting tab 123 perpendicularly extending from the side wall body 121, a resisting tab 125 perpendicularly extending from the pivoting tab 123, and a securing tab 127 extending from the resisting tab 125. The securing tab 127 is L-shaped. The pivoting tab 123 defines a pivoting hole 1231.

The base 30 includes a base body 31, two mounting tabs 33 extending from the base body 31, and a positioning portion 35 extending from the base body 31. The positioning portion 35 includes a connecting portion 351 extending from the base body 31 and a positioning protrusion 353 extending from the connecting portion 351. The positioning protrusion 353 is arc-shaped. The positioning protrusion 353 includes a resisting flange 3531. The resisting flange 3531 is arc-shaped. The base body 31 defines a through hole 311 and a sliding hole 313 corresponding to the sliding shaft 15. The two mounting tabs 33 are substantially parallel to each other. Each mounting tab 33 defines a mounting cutout 331.

The driving device 50 includes rotating shaft 51, a driving shank 53, and an eccentric wheel 55. The rotating shaft 51 includes a shaft body 511, a positioning gear 513 extending from the shaft body 511, and a vane wheel 515.

The shaft body 511 defines an axis of rotation. The shaft body 511 includes a worm portion 5111. The vane wheel 515 includes a plurality of vanes 5151. An angle is defined between the rotating axis and each vane 5151. The positioning gear 513 defines a plurality of positioning key walls 5131. The driving shank 53 includes a shank body 531 and a driving gear 533 extending from the shank body 531. The driving gear 533 is configured to engage with the worm portion 5111 of the shaft body 511.

Figure 3:
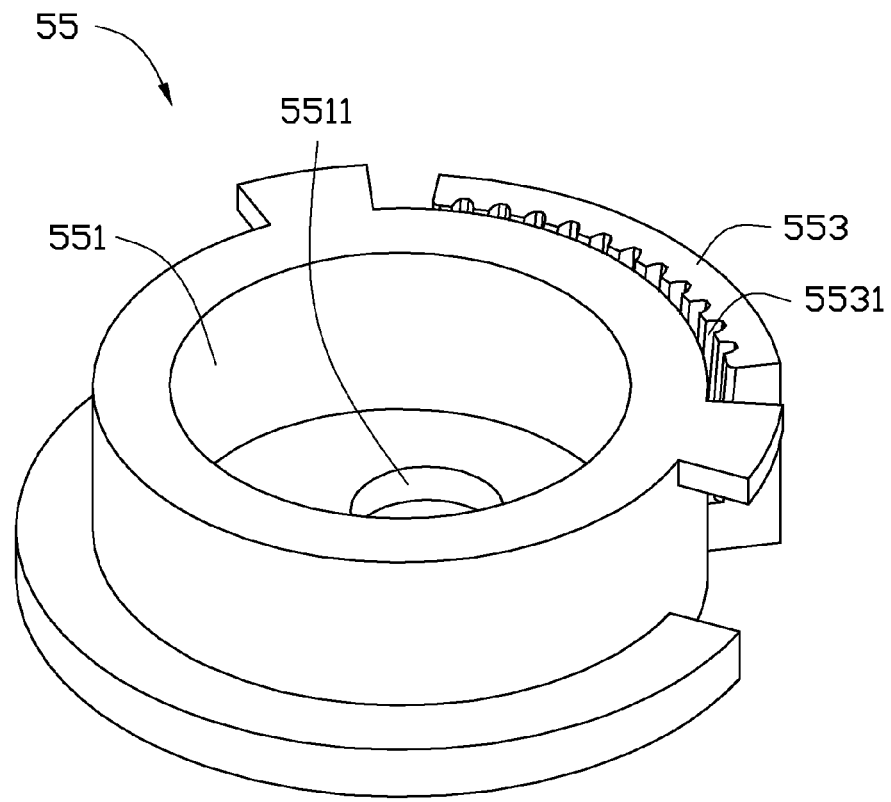
FIG. 3 is an isometric view of the eccentric wheel of FIG. 1.

Referring to FIG. 3, the eccentric wheel 55 includes an eccentric wheel body 551 and an engaging portion 553 extending from the eccentric wheel body 551. The engaging portion 553 is arc-shaped and defines a plurality of engaging key walls 5531 facing the eccentric wheel body 551. The engaging key walls 5531 are configured to engage with the teeth 131 of the belt 13. The eccentric wheel body 551 defines a securing hole 5511 which is not located in the center of the eccentric wheel body 551. The securing hole 5511 is close to the engaging portion 553. The securing hole 5511 is configured to receive the shank body 531 of the driving shank 53.

Figure 4:
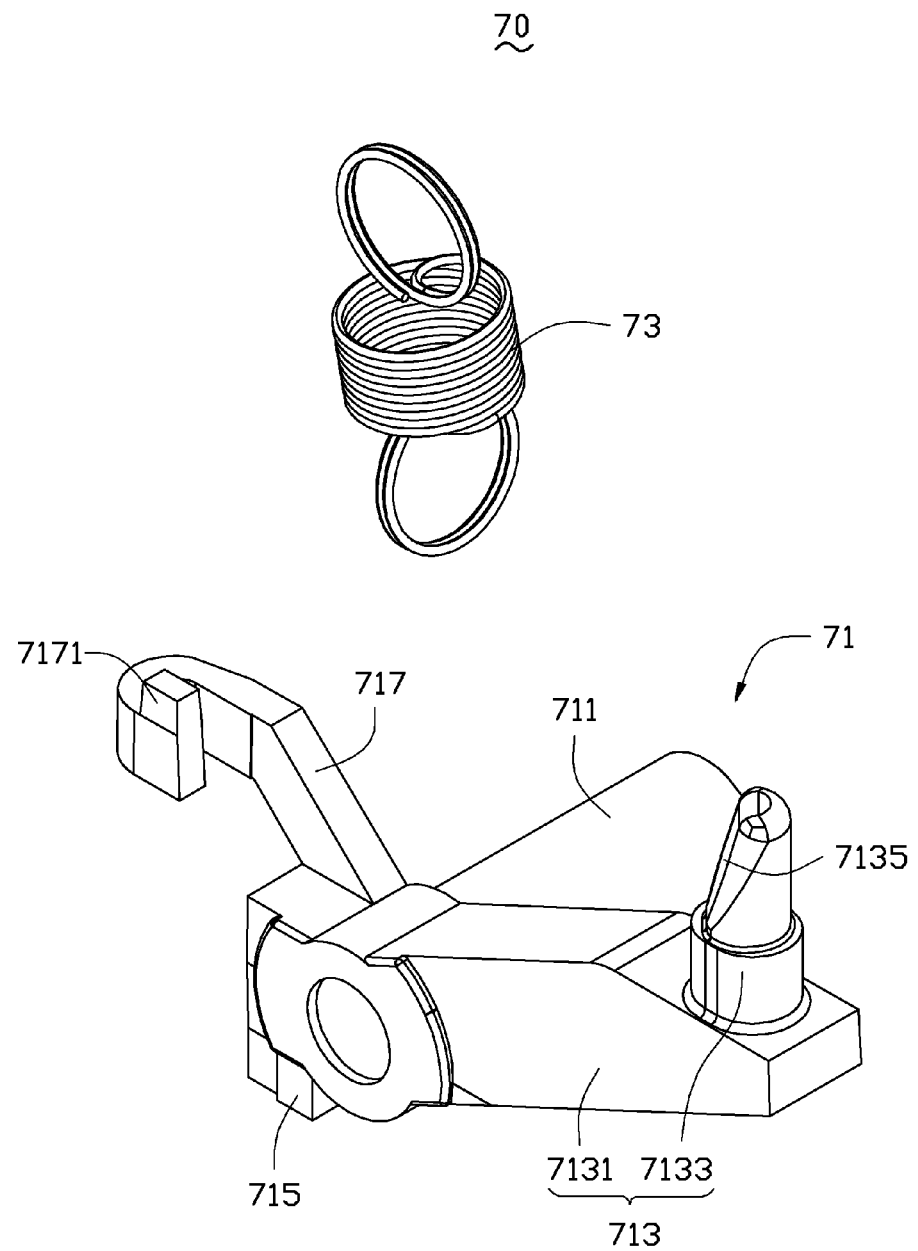
FIG. 4 is an isometric view of the resisting device of FIG. 1.
Figure 5:
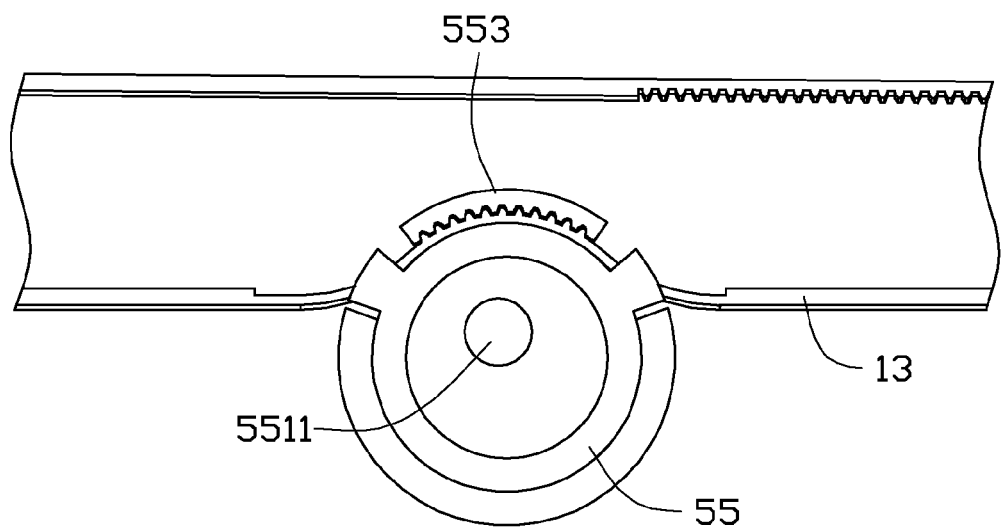
FIG. 5 is an assembled view of the eccentric wheel and the belt of FIG. 1.
Figure 6:
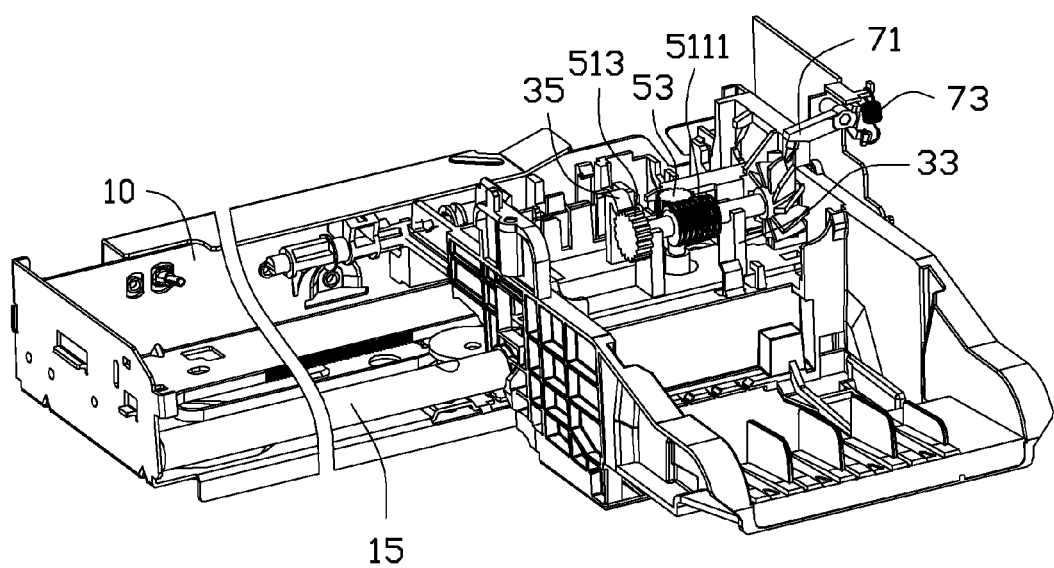
FIG. 6 is an assembled view of FIG. 1.
Figure 7:
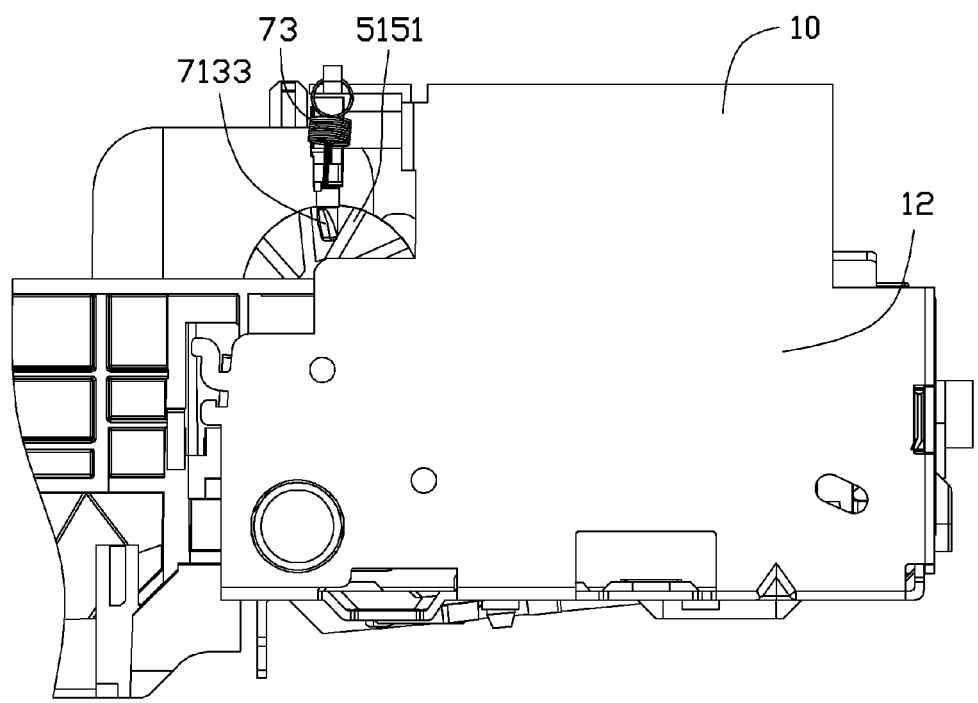
FIG. 7 is similar to FIG. 6, but viewed from another aspect.

Referring to FIG. 4, the resisting device 70 includes a resisting member 71 and an elastic member 73. In one embodiment, the elastic member 73 is a spring. The resisting member 71 includes a pivoting shaft 711, a resisting portion 713 extending from the pivoting shaft 711, a stopper portion 715 extending from the pivoting shaft 711, and a mounting arm 717 extending from the pivoting shaft 711. The mounting arm 717 includes a U-shaped securing portion 7171. The resisting portion 713 includes a connecting arm 7131 connected to the pivoting shaft 711 and a resisting protrusion 7133 extending from the connecting arm 7131. The resisting protrusion 7133 defines an inclining surface 7135. The elastic member 73 is configured to be connected between the securing portion 7171 and the securing tab 127 of the bracket 10.

Referring to FIGS. 1 to 7, in assembly, the engaging key walls 5531 of the eccentric wheel 55 engages with the teeth 131 of the belt 13. At this time, the belt 13 is located between the eccentric wheel body 551 and the engaging portion 553. The through hole 311 of the base 30 is aligned with the securing hole 5511 of the eccentric wheel 55. The sliding shaft 15 is received in the sliding hole 313 of the base 30. The driving shank 53 extends through the through hole 311 to be secured in the securing hole 5511. The shaft body 511 of the rotating shaft 51 is mounted in the mounting cutout 331 of the base 30, and the worm portion 5111 of the shaft body 511 is placed between the two mounting tabs 33 to engage with driving gear 533 of the driving shank 53. At this time, the positioning protrusion 353 of the positioning portion 35 is positioned in the positioning key walls 5131 of the positioning gear 513.

The pivoting shaft 711 of the resisting member 71 is pivotally received in the pivoting hole 1231 of the bracket 10, and the elastic member 73 is connected between the securing portion 7171 of the resisting member 71 and the securing tab 127 of the bracket 10. At this time, the stopper portion 715 of the resisting member 71 resists the resisting tab 125 of the bracket 10.

In use, when the tension of the belt 13 needs to be adjusted, the motor is working and the base 30 moves close to the first side wall 12. The resisting protrusion 7133, in contacting the resisting protrusion 7133, drives the vane wheel 515 to rotate, thereby driving the driving shank 53 to rotate. The eccentric wheel 55 is driven to rotate to drive the belt 13 to be tightened. When the base 30 moves close to the first side wall 12, the inclining surface 7135 of the resisting protrusion 7133 is resisted by the vane 5151 and moves up, thereby stretching the elastic member 73. When the inclining surface 7135 does not make contact with the vane 5151, the elastic member 73 restores.

It is to be understood, however, that even though numerous characteristics and advantages of the embodiments have been set forth in the foregoing description, together with details of the structure and functions of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A belt adjusting device of a printer, comprising:
   a bracket, the bracket comprises a bottom wall, a first side wall, a second side wall extending from the bottom wall, and a belt placed on the bottom wall;
   a base, the base is slidably mounted to the bracket;
   a driving device, the driving device comprises an eccentric wheel engaging with the belt, a driving shank, and a rotating shaft; the driving shank comprises a shank body secured to the eccentric wheel and a driving gear extending from the shank body; the rotating shaft comprises a shaft body pivotally mounted to the base and a vane wheel extending from one end of the shaft body; the shaft body comprises a worm portion engaging with the driving gear; the vane wheel comprises a plurality of vanes; and
   a resisting member, the resisting member comprises a resisting protrusion, the resisting protrusion is configured to resist one of the plurality of vanes to enable the rotating shaft to rotate to drive the eccentric wheel to rotate to adjust the belt when the base moves close to the first side wall.

2. The belt adjusting device of claim 1, wherein the eccentric wheel comprises a eccentric wheel body and an engaging portion extending from the eccentric wheel body; the engaging portion is arc-shaped and defines a plurality of engaging key walls facing to the eccentric wheel body; and the belt comprises a plurality of teeth on an inner side of the belt, the plurality of teeth engage with the plurality of engaging key walls.

3. The belt adjusting device of claim 2, wherein the eccentric wheel body defines a securing hole located not in the center of the eccentric wheel body; and the shank body is secured in the securing hole; and the securing hole is close to the engaging portion.

4. The belt adjusting device of claim 1, wherein the resisting member further comprises a pivoting shaft pivotally mounted to the first side wall and a connecting arm extending from the pivoting shaft, and the resisting protrusion extends from the connecting arm.

5. The belt adjusting device of claim 4, wherein the resisting member further comprises a stopper portion extending from the pivoting shaft; the first side wall comprises a side wall body and a resisting tab extending from the side wall body; and the resisting tab is configured to prevent the stopper portion from moving along a first direction.

6. The belt adjusting device of claim 5, further comprising an elastic member, wherein the resisting member further comprises a mounting arm extending from the pivoting shaft; the first side wall further comprises a securing tab extending from the side wall body; the elastic member is connected between the mounting arm and the securing tab; and the elastic member is configured to rebound along the first direction when the stopper portion moves along a second direction substantially opposite to the first direction.

7. The belt adjusting device of claim 6, wherein the mounting arm comprises a U-shaped securing portion, and the elastic member is connected to the U-shaped securing portion.

8. The belt adjusting device of claim 1, wherein the resisting protrusion defines an inclining surface for resisting the one of the plurality of vanes.

9. The belt adjusting device of claim 1, wherein the rotating shaft further comprises a positioning gear extending from another end of the shaft body; the base comprises a base body and a positioning portion; the positioning portion comprises a connecting portion extending from the base body and a positioning protrusion extending from the connecting portion; the positioning protrusion is arc-shaped; and the positioning protrusion is located in a positioning key wall of the positioning gear.

10. The belt adjusting device of claim 9, wherein the base further comprises two mounting tabs extending from the base body; each of the two mounting tabs defines a mounting cutout; and the shaft body of the rotating shaft is pivotally mounted in the two mounting cutouts.

11. A belt adjusting device of a printer, comprising:
    a bracket, the bracket comprises a bottom wall and a belt placed on the bottom wall;
    a base, the base is slidably mounted to the bracket;
    a driving device, the driving device is mounted to the base and comprises an eccentric wheel engaging with the belt; and
    a resisting member, the resisting member resists the driving device to enable the eccentric wheel to rotate to adjust the belt when the base slides relative to the bracket.

12. The belt adjusting device of claim 11, wherein the driving device further comprises a driving shank and a rotating shaft; the driving shank comprises a shank body secured to the eccentric wheel and a driving gear extending from the shank body; the rotating shaft comprises a shaft body pivotally mounted to the base and a vane wheel extending from one end of the shaft body; the shaft body comprises a worm portion engaging with the driving gear; the vane wheel comprises a plurality of vanes; the resisting member comprises a resisting protrusion; and the resisting protrusion is configured to resist one of the plurality of vanes to enable the rotating shaft to rotate to drive the eccentric wheel to rotate to adjust the belt.

13. The belt adjusting device of claim 12, wherein the eccentric wheel comprises a eccentric wheel body and an engaging portion extending from the eccentric wheel body; the engaging portion is arc-shaped and defines a plurality of engaging key walls facing to the eccentric wheel body; the belt comprises a plurality of teeth on an inner side of the belt; and the plurality of teeth engage with the plurality of engaging key walls.

14. The belt adjusting device of claim 13, wherein the eccentric wheel body defines a securing hole located not in the center of the eccentric wheel body; the shank body is secured in the securing hole; and the securing hole is close to the engaging portion.

15. The belt adjusting device of claim 12, wherein the bracket further comprises a first side wall and a second side wall extending from the bottom wall; the resisting member further comprises a pivoting shaft pivotally mounted to the first side wall and a connecting arm extending from the pivoting shaft, and the resisting protrusion extends from the connecting arm.

16. The belt adjusting device of claim 15, wherein the resisting member further comprises a stopper portion extending from the pivoting shaft; the first side wall comprises a side wall body and a resisting tab extending from the side wall body; and the resisting tab is configured to prevent the stopper portion from moving along a first direction.

17. The belt adjusting device of claim 16, further comprising an elastic member, wherein the resisting member further comprises a mounting arm extending from the pivoting shaft; the first side wall further comprises a securing tab extending from the side wall body; the elastic member is connected between the mounting arm and the securing tab; and the elastic member is configured to rebound along the first direction when the stopper portion moves along a second direction substantially opposite to the first direction.

18. The belt adjusting device of claim 17, wherein the mounting arm comprises a U-shaped securing portion, and the elastic member is connected to the U-shaped securing portion.

19. The belt adjusting device of claim 12, wherein the resisting protrusion defines an inclining surface for resisting the one of the plurality of vanes.

20. The belt adjusting device of claim 12, wherein the rotating shaft further comprises a positioning gear extending from another end of the shaft body; the base comprises a base body and a positioning portion; the positioning portion comprises a connecting portion extending from the base body and a positioning protrusion extending from the connecting portion; and the positioning protrusion is arc-shaped; and the positioning protrusion is located in a positioning key wall of the positioning gear.

* * * * *